United States Patent [19]

Jennings

[11] 4,242,617
[45] Dec. 30, 1980

[54] ELECTRIC VEHICLE HAVING DYNAMIC BRAKING AND REGENERATION

[75] Inventor: Marvin D. Jennings, Naperville, Ill.

[73] Assignee: International Harvester Company, Chicago, Ill.

[21] Appl. No.: 946,251

[22] Filed: Sep. 21, 1978

Related U.S. Application Data

[63] Continuation of Ser. No. 764,776, Feb. 2, 1977, abandoned.

[51] Int. Cl.³ .............................................. H02K 7/10
[52] U.S. Cl. ....................................................... 318/13
[58] Field of Search ........................................... 318/13

[56] References Cited
U.S. PATENT DOCUMENTS

| | | | |
|---|---|---|---|
| 2,179,364 | 11/1939 | Weber | 318/13 |
| 2,429,570 | 10/1947 | Trofimov | 318/13 |
| 2,480,065 | 8/1949 | Wanner | 318/13 |

Primary Examiner—J. V. Truhe
Assistant Examiner—Eugene S. Indyk
Attorney, Agent, or Firm—Douglas W. Rudy; Ronald C. Kamp; F. David AuBuchon

[57] ABSTRACT

An electrical vehicle is propelled by a constant speed motor receiving current from a storage battery. An alternator, driven by the vehicle power train through a differential while the vehicle is in motion, is associated with the drive train such that it controls the velocity of the vehicle. Dynamic braking through increasing field current of the alternator is provided. The alternator is used to recharge the storage battery during periods of less than maximum vehicle velocity and also during deceleration of the vehicle.

9 Claims, 3 Drawing Figures

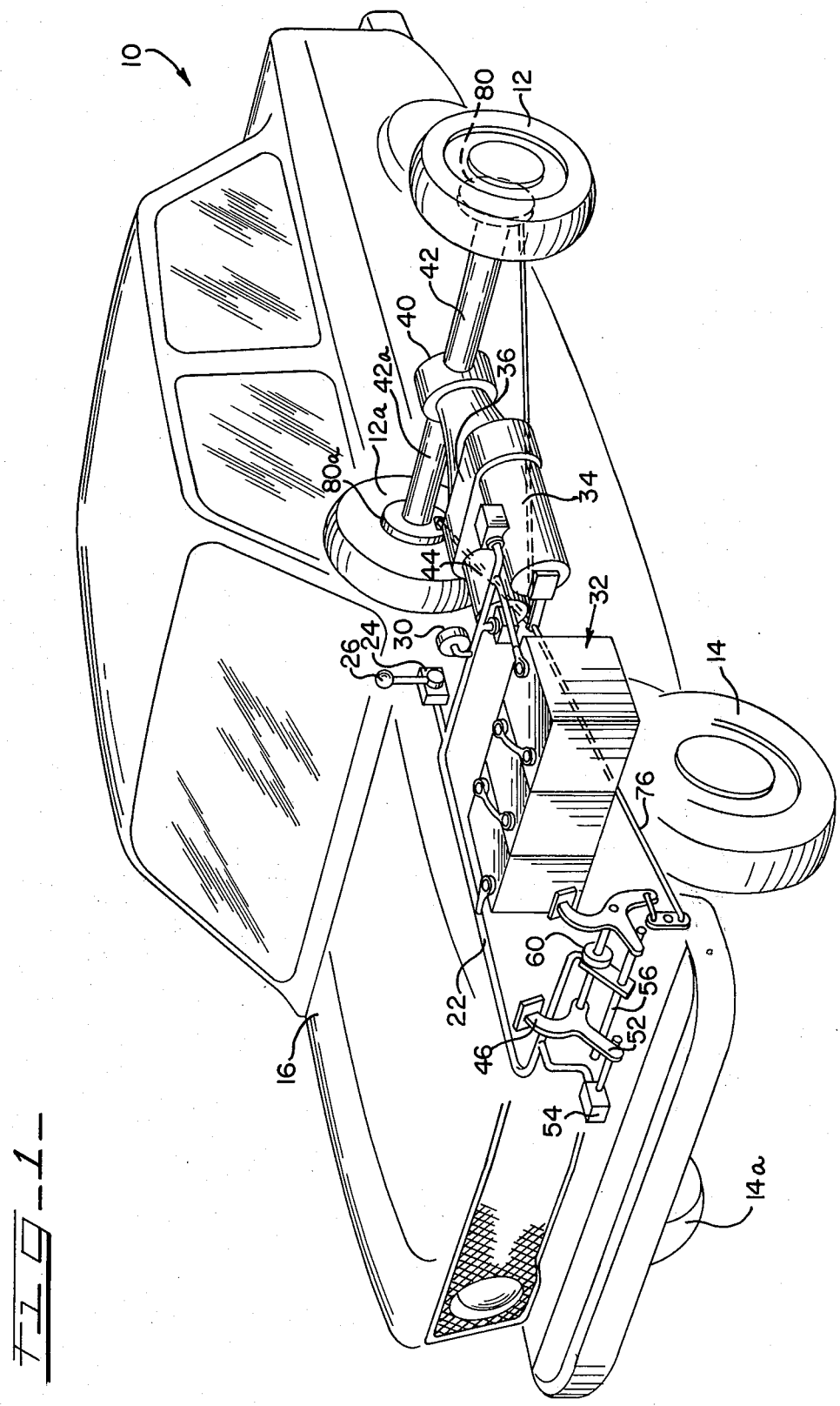

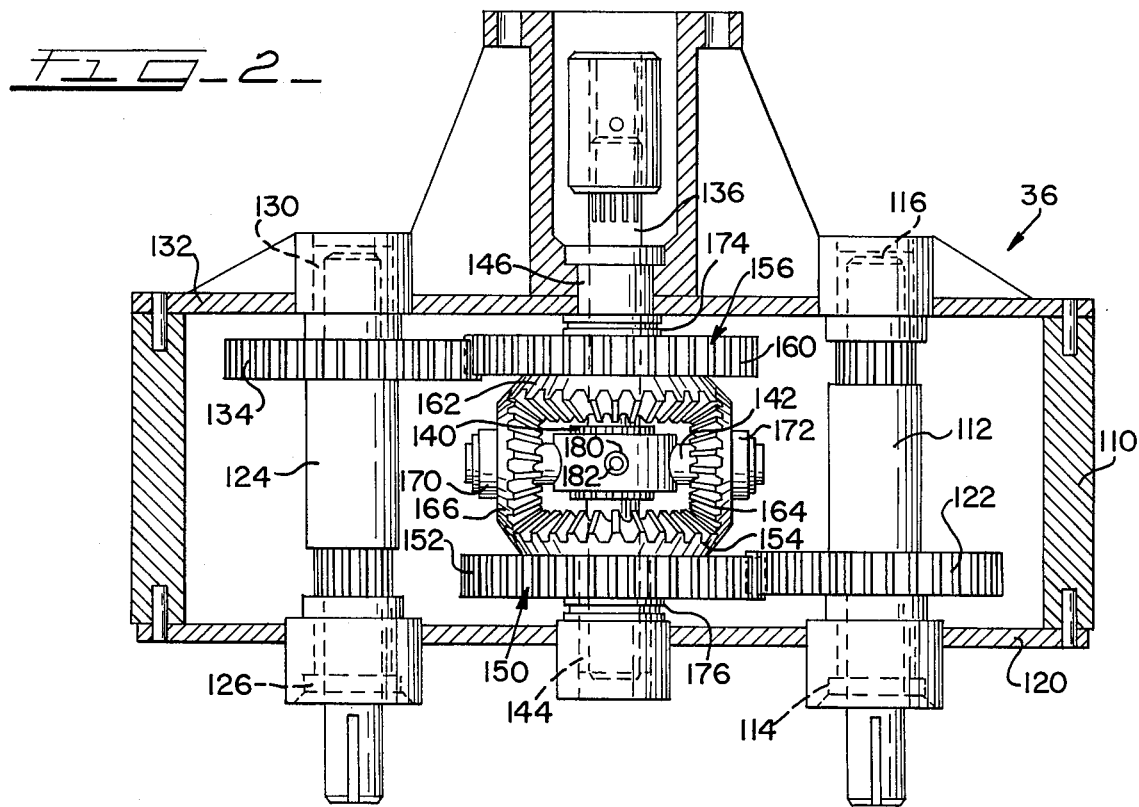
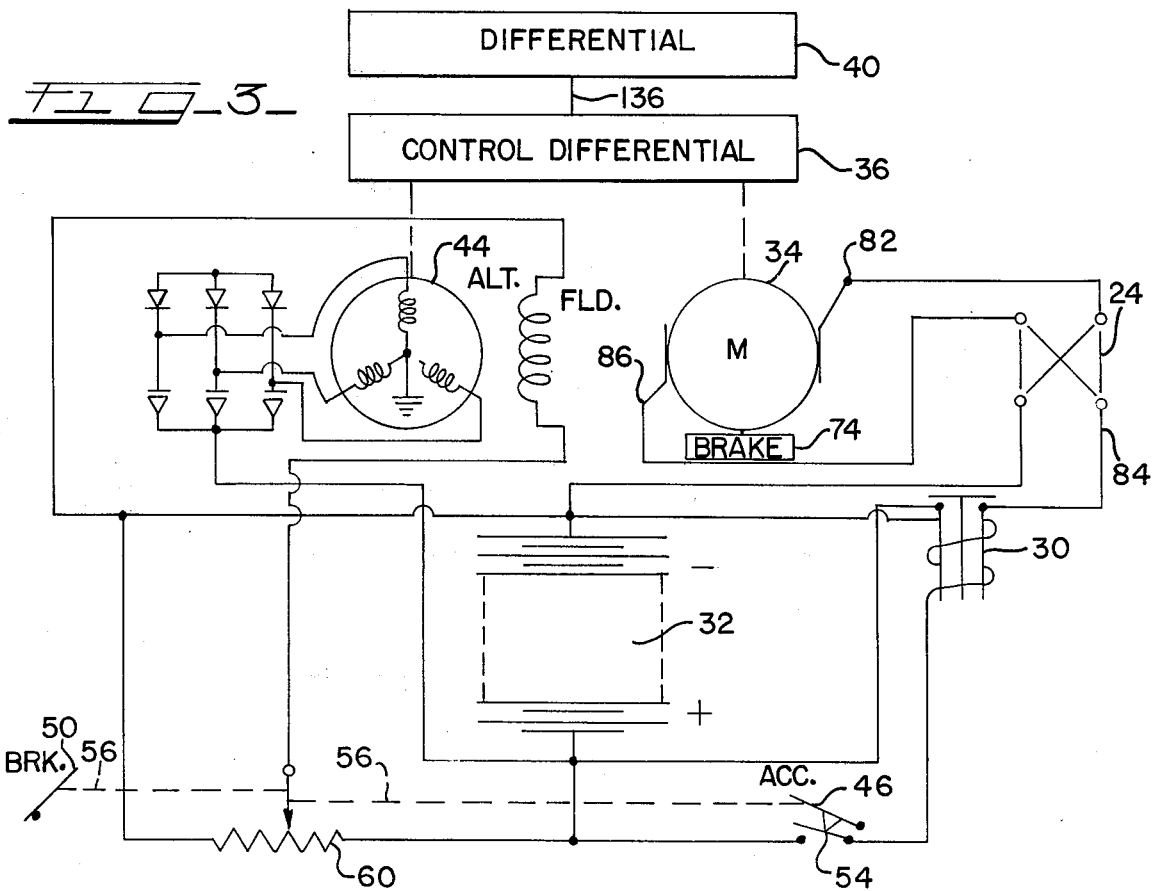

ELECTRIC VEHICLE HAVING DYNAMIC BRAKING AND REGENERATION

This is a continuation of application Ser. No. 764,776, filed Feb. 2, 1977, now abandoned.

BACKGROUND OF THE INVENTION

This invention relates to electric vehicles having regenerative devices for recharging the vehicle's battery. More specifically, regeneration is provided by an alternator driven through the vehicle drive train. The drive train distributes the mechanical output of the constant speed motor between the alternator and the final drive under the direction of the alternator.

Disadvantages of contemporary electric vehicles include the usually limited range and performance capability of the electric vehicle and the high cost of control components. Electric vehicles are becoming more refined in order to overcome these deficiencies. For instance, regeneration and dynamic braking is provided in contemporary vehicles through the conversion of the vehicle motor units into generators. A typical embodiment is to have wheel mounted drive motors that are, upon application of the vehicle brakes, switched to act as generators which in turn are driven by the vehicle wheels during periods of deceleration such that electrical energy is provided to the battery. This regeneration helps to increase the range of the electric vehicle.

The electric vehicle of this invention counters the disadvantages of heretofore known developments in this field by providing a control device that allows acceleration of the vehicle without wasting energy while concurrently providing good vehicle range and performance.

SUMMARY OF THE INVENTION

An electric vehicle is provided that has regeneration and dynamic braking provisions. An electric motor drives a final drive through a control differential gearbox having differential capabilities including a reactive portion that is linked to an alternator. The motor runs at constant speed regardless of desired vehicle speed. Mechanical motor output not needed to propel the vehicle is directed to the alternator to provide regeneration.

Vehicle velocity is controlled by varying the alternator field current strength thus imposing a reactive force on the differential portion of the gearbox.

Dynamic braking and regeneration results when the alterator field is increased and the final drive means is driving the control differential gearbox from the output shaft thereof when the current to the motor has been interrupted and the motor braked.

The general object of this invention is to provide an electric vehicle that has increased range due to the regenerative capabilities of the drive system while also having excellent performance including acceleration.

Another object of the invention is to allow regeneration when the vehicle is moving at less than maximum speed.

These and other objects and advantages will be set forth in the following specification.

BRIEF DESCRIPTION OF THE DRAWINGS

FIG. 1 is a pictorial layout showing the equipment of the invention in a vehicle;

FIG. 2 is a partially sectioned view of the major components of the control differential gearbox of the invention; and FIG. 3 is a schematic presentation of the electrical components, circuitry and drive means of the invention.

DETAILED DESCRIPTION OF THE DRAWINGS

FIG. 1 is a representation of an electric vehicle, generally 10, having rear traction wheels 12 and 12a and steerable wheels 14 and 14a. The body 16 of the vehicle is partially incomplete in order to allow a view of the important components of the electrical drive systems of the vehicle.

A wiring harness 22 provides electrical communication between the electrical running and control gear of the vehicle. A vehicle direction selector 24 having a lever 26 positionable to either a forward, neutral, or reverse position is provided. A motor solenoid 30 is provided between the vehicle battery 32 and the electric motor 34.

The electric motor 34 is the prime mover for the vehicle and as such it drives the vehicle through control differential gearbox 36, through a conventional differential 40, thence through axles 42 and 42a to the rear traction wheels 12.

Also coupled with the control differential gearbox 36 is an alternator 44.

Vehicle velocity is controlled through the use of an accelerator pedal 46 and a brake pedal 50. The accelerator pedal has a bell crank arm 52 which is in contact with a switch 54 for the motor solenoid 30. The bell crank arm 52, when depressed, contacts rod 56 which is a control rod providing positional mechanical input to a variable resistor 60 for speed control.

The brake pedal 50 also has a bell crank arm 62 which when depressed contacts rod 56. A second bell crank arm 64 of the brake pedal is connected to a brake linkage bell crank 66 by means of a first link 70. A second link 72 connects the brake linkage bell crank 66 to a brake 74 on an electric motor 34. A third link 76 continues from the termination of the second link 72 to vehicle brakes 80 and 80a on the rear axles 42 and 42a of the electric vehicle 10.

The electric vehicle shown in FIG. 1 should be envisioned as a complete electric vehicle having all the necessary components to make it road worthy. Many items, such as the steering wheel, the steering linkages, front brakes, and the vehicle seats have not been shown in FIG. 1 as they are conventional and not necessary to the understanding of the instant invention.

In FIG. 3 a battery 32 source of electrical energy is provided. For this embodiment it would be convenient to have a bank of storage batteries connected in series to deliver a voltage to the electric motor. When the switch 54 for the motor solenoid is closed the motor solenoid 30 will be closed allowing current to flow from the positive terminal of the battery to a first terminal 82 of the motor 34 via cable 84.

This arrangement would produce mechanical motor output that results in forward drive of the vehicle. Reverse drive of the vehicle would necessitate the motor armature being rotated in the reverse direction. This is done by means of the vehicle direction selector 24 which electrically switches the input between poles 82 and 86 of the electric motor 34. Variable resistor 60 is controlled by accelerator pedal 46 and in turn controls the field current strength of the alternator 44.

Both the alternator 44 and the electric motor 34 have shafts coupling them with the control differential gearbox 36. The output shaft of the control differential gearbox is coupled with a conventional automotive type differential 40 which accommodates the vehicle axles.

FIG. 2 presents a top view of the control differential gearbox, generally 36, with a portion of the housing removed to show the arrangement of the gears therein. As the control differential gearbox acts as a control member for controlling the velocity of the electric vehicle it will be discussed in detail.

The housing or casing 110 of the control differential gearbox shown in FIG. 2 contains an input shaft 112 having a splined end as well as smooth portions for accommodating a first end bearing pack 114 and a second end bearing pack 116. Carried on the input shaft 112, inside the housing 110 in proximity to the front wall 120 thereof, is an input shaft gear 122.

A control shaft 124 having a splined portion outside of the housing 110 and smooth portions for accommodating a second first end bearing pack 126 and a second second end bearing pack 130 is carried by the housing 110. Carried on the control shaft 124, inside the housing in proximity to the rear wall 132 thereof, is a control shaft gear 134.

The input shaft is coupled by conventional appropriate means to the electric motor 34 for mutual rotation thereof. The control shaft is coupled by conventional appropriate means to the alternator 44. The control shaft 124 may be considered an output shaft as the control differential gearbox will supply input motion to drive the alternator through control shaft 124. In this embodiment it has been deemed a control shaft as the alternator (and consequently the control shaft 124) determines the amount of driving output delivered to the final drive differential 40 through the true output shaft 136 of the control differential gearbox.

The output shaft 136 of the control differential gearbox has a splined center portion 140 that accommodates a differential cluster gear assembly.

The shaft is supported in the front wall of the housing by a bearing pack 144 and at the rear wall of the housing by a roller bearing 146.

The cluster gear assembly is made up of a two legged spider 142 which has an enlarged center portion being splined to allow the spider to be positioned over the splines of the shaft 140.

A first hybrid gear 150 consisting of a first drive gear 152 and a first differential gear 154 is located at the inner end of the output shaft 136. This gear is driven by the input shaft gear 122.

A second hybrid gear 156 consisting of a second drive gear 160 and a second differential gear 162 is located at the outer end of the output shaft 136. The second hybrid gear 156 is driven by the control shaft gear 134.

A first pinion gear 164 and a second pinion gear 166 are carried on restrictive legs of spider 142. Each pinion gear meshes with each differential gear while being maintained on the spider by retainer means 170 and 172. Thrust bearings 174 and 176 are carried by the output shaft between the respective back wall 132 and second hybrid gear 156 and front wall 120 and first hybrid gear 150.

An aperture 180 is provided in the center portion of the spider 140 to receive a pin 182 projecting from the splined center portion 140 of output shaft 136 having a slightly smaller diameter than the aperture, which helps to locate the spider on the output shaft 136 and prevents output shaft 136 from being unintentionally withdrawn from the control differential gearbox 36.

OPERATION OF AN EMBODIMENT INCORPORATING THE INVENTION

The vehicle will be activated by the following events:
The vehicle direction selector 24 will be positioned for the desired direction of travel.

When the accelerator pedal 46 is depressed the switch 54 for the motor solenoid is activated closing the motor solenoid 30. The circuit between the battery 32 and the electric motor 34 is now complete. The electric motor will drive the alternator through the control differential gearbox 36 at the full output RPM of the motor.

As a field current has not been imposed on the alternator, torque is transferred from the electric motor to alternator through the path of (see FIG. 2) input shaft 112, input shaft gear 122, first hybrid gear 150, both pinions 164 and 166 (while the spider remains stationary as the torque to drive the rear wheels exceeds the torque to drive the alternator due to the differential effect of the control differential gearbox), second hybrid gear 156, control shaft gear 134, which is splined to the control shaft 124, which is in turn coupled to the alternator.

The field current of the alternator is now increased as the operator depresses the accelerator pedal 46. (Accelerator linkage design is discretionary.) The linkage 56 from the accelerator pedal is progressive in that it first closes the switch 54 and then affects the setting of the variable resistor 60. The bell crank arm 52 (see FIG. 1) of the pedal strikes rod 56 which causes the adjustment of the variable resistor 60 which controls the current to the alternator field. As the alternator field increases the torque resistance of the alternator increases. As this torque increases the output shaft 136 of the control differential gearbox 36 is caused to react. The torque path through the gearbox 36 is as before with the exception that the spider is caused to rotate due to the torque load imposed by the alternator. As the spider moves the output shaft 136 must also move as the spider is splined (and also loosely pinned) to the output shaft 136.

The torque input of the electric motor is split by the control differential gearbox 36 with a portion of the input being distributed to the output shaft 136 to drive the final drive and a portion of the motor input being delivered to the alternator to drive it and regenerate electrical energy.

It may be seen that the vehicle acceleration and motion is a function of the field current of the alternator. When the field current of the alternator is zero all the input of the electric motor will be driving the alternator. Upon operator initiated acceleration the field current of the alternator increases causing at least a portion of the motor input to be diverted through differential reaction to the final drive to propel the vehicle.

One of the advantages of this electric motor control is that the motor is always the recipient of full voltage from the battery. The motor will not bog down under normal loads as its design torque capability is always metered by the control differential gearbox between the final drive and the alternator.

Regeneration and dynamic braking is accomplished when the vehicle operator depresses the brake pedal 50. In FIG. 1 the bell crank arm 62 of the brake pedal will contact the rod 56 and as the rod is displaced from a neutral position the variable resistor 60 will be adjusted to increase the field current of the alternator. The retarding force presented by the alternator provides dynamic braking. The alternator field current strength increases in response to the brake pedal 50 acting on the variable resistor 60 when the accelerator pedal is not depressed, thus dynamic braking and regeneration increase as the pedal is depressed.

Further regeneration and dynamic braking is accomplished when the vehicle operator further depresses the brake pedal 50 causing the brake 74 on the electric motor to be engaged and thus stop the electric motor. The motor brake will only have to resist the torque load directed to it by the control differential gearbox 36 as the current to the motor has been interrupted when the vehicle operator released the accelerator (to engage the brake pedal) thus opening switch 54 for the motor solenoid 30. When the motor has been braked the traction wheels will drive the control differential gearbox 36 through the output shaft 136 thereof. As the electric motor shaft is being held stationary by the brake 74 the torque path through the control differential gearbox is from the output shaft 136 to the rotating spider 142, to the second hybrid gear 156, thence to the control shaft gear 134 and to the control shaft 124 which is in splined continuity therewith. The alternator is driven by the control shaft.

Dynamic braking also increases as the brake pedal is further depressed since the variable resistor 60 will be further adjusted to increase the alternator field.

Upon further brake pedal depression the mechanical brake linkage to the vehicle wheels will be activated to stop the vehicle through the conventional mechanical brakes.

On acceleration after a stop the operator merely releases the brakes and depresses the accelerator. The accelerator first closes the switch for the motor solenoid then adjusts the field of the alternator through the variable resistor adjustment as before thus increasing the torque load of the alternator until the control differential gearbox directs the path of torque from the electric motor to the final drive.

Another aspect of the embodiment herein described is the fact that the vehicle has a capability to free wheel or coast. In a coast situation the final drive will present a torque load to the control differential gearbox through the output shaft thereof higher than the torque being supplied by the electric motor. When the operator lifts his foot off of the accelerator the variable resistor 60 will be in a position providing zero field current in the alternator. The motor solenoid switch 54 and consequently the motor solenoid 30 will be opened thereby preventing current flow between the battery and the motor. The input shaft 112 and the control shaft 124 will be virtually motionless although movement would not be detrimental to vehicle performance except for higher frictional losses. Coasting may be accomplished with the instant invention thus further increasing the vehicle range as no energy will be drawn from the battery.

If the vehicle operator desired he could allow regeneration while coasting if on a steep hill. He would depress the brake pedal to the point of causing the brake of the electric motor to engage. At this point there would be field current in the alternator giving a degree of dynamic braking as explained earlier, however, if the hill was sufficiently steep the vehicle will still coast and the alternator would both regenerate energy to the battery while also providing some dynamic braking.

The electric vehicle will not be able to maintain its battery in a full state of charge since regeneration is only a part time benefit used mainly to improve the vehicle range. Consequently, it should be realized that the vehicle will have to be connected to a source of electrical energy in order to fully recharge the battery. This will have to be done on a frequency basis depending on the amount of vehicle usage.

In emergency situations where it is imperative that the battery be recharged it is logical that the vehicle could be towed or pushed while in an appropriate gear with the motor brake engaged (but not the vehicle brake). The motor brake could be engaged by the vehicle operator in a conventional manner. The traction wheels would drive the control differential gearbox and the torque path would lead to the alternator as the motor would be braked. The alternator could then provide energy to the battery.

VARIANT OF THE PREFERRED EMBODIMENT

The control differential gearbox may also be used in an electric vehicle without the motor brake 74 as disclosed in the previous embodiment. In an embodiment absent the motor brake the control differential gearbox would function as a regulating device. The electrical wiring would be as previously described, however, the brake linkage or operating system would be conventional.

Vehicle acceleration would be as previously described with the electric motor at full speed upon accelerating and driving while the control differential gearbox splits the torque output of the motor between the final drive and the variable field alternator thus providing at least partial regeneration.

Dynamic braking would be possible as the brake linkage would still affect the variable resistor adjustment thus increasing the alternator field current to dynamically brake the vehicle.

In this variant of the preferred embodiment the vehicle would have the coasting or free wheeling advantage previously described.

Thus, it is apparent that there has been provided, in accordance with the invention, an electric variable speed regenerative drive system that fully satisfies the objects, aims and advantages set forth above. Although the invention has been described in conjunction with a specific embodiment thereof, it is evident that many alternatives, modifications, and variations will be apparent to those skilled in the art in light of the foregoing description. For example, the invention might be equally utilized on other types of electric vehicles such as golf carts, delivery trucks, cycles, industrial trucks or similar equipment. Accordingly, it is intended to embrace all such alternatives, modifications and variations that fall within the spirit and broad scope of the appended claims.

What is claimed is:

1. A regenerative drive electric control system for use on an electric vehicle having ground engaging means including a traction wheel carried by an axle driven through a final drive gear, the improvement comprising;

an electric motor having an output shaft, said electric motor operating at a constant speed when energized;

a motor brake for selectively preventing the rotation of said output shaft of said electric motor;

a mechanical brake for stopping said vehicle;

a battery source of electrical energy for supplying current to said electric motor;

an alternator having a variable resistance field and an input shaft, the input shaft torque load being directly increased with an increase in said variable resistance field, said alternator electrically connected to said battery to provide electrical energy to charge said battery;

an electrical current circuit including an on-off electrical switch, a vehicle direction selector having forward, neutral and reverse positions, a motor solenoid to control the passage of electrical current between said battery and said electric motor, a switch for activating said motor solenoid and a variable resistor for controlling said field of said alternator;

a control differential gearbox coupled to said motor, said alternator and said final drive gear for distributing a drive output of said electric motor, said drive including a zero output of said electric motor when said motor brake is engaged, to said alternator and to said final drive gear of said electric vehicle;

an accelerator pedal having a linkage for closing said electrical current circuit switch for activating said motor solenoid and for progressively adjusting said variable resistor to increase said field of said alternator whereby the resistance to motion of said alternator due to said increase in said field of said alternator results in an increased torque load to said control differential gearbox resulting in vehicle motion;

a brake pedal having a linkage for progressively increasing said field of said alternator through adjustment of said variable resistor and progressively applying said brake of said electric motor whereby regeneration of said battery by said alternator occurs when said brake of said electric motor is energized to prevent electric motor rotation and said vehicle is in motion.

2. The electrical control system in accordance with claim 1 wherein said electric motor is caused to operate at a constant speed and to deliver constant torque to said regenerative drive gearbox until said brake for selectively preventing the rotation of said output shaft of said electric motor is engaged to prevent the rotation of said output shaft of said electric motor.

3. The electrical control system in accordance with claim 1 wherein said variable resistance alternator field controls the velocity of said electric vehicle by distributing the torque load presented by said motor to either the alternator or to said control differential gearbox output shaft.

4. The invention in accordance with claim 1 wherein said battery source of electrical energy may be charged by said alternator when said control differential gearbox distributes motion such that said input shaft of said alternator is caused to rotate resulting in motion between said armature and said field of said alternator.

5. The invention in accordance with claim 1 wherein said electric vehicle further comprises:

an accelerator pedal for allowing the vehicle operator to accelerate the vehicle;

a brake pedal for allowing the vehicle operator to check vehicle speed;

a variable resistor communicative with said accelerator pedal and said brake pedal whereby the field strength of said alternator can be varied.

6. The invention in accordance with claim 5 wherein the accelerator pedal displacement causes current to flow from said battery to said motor resulting in output of said motor and further displacement of said accelerator pedal results in setting the magnitude of said alternator field current whereby the resistance to motion of the alternator due to said field current results in a predetermined amount of drive to said control differential gearbox from said motor to said final drive gear.

7. The invention in accordance with claim 5 wherein the brake pedal displacement results in increasing the field of the alternator whereby regeneration may occur while the vehicle is in motion and said final drive will drive said control differential gearbox which will distribute drive torque to said alternator.

8. The invention in accordance with claim 7 wherein increased brake pedal displacement may also brake said motor by means provided by said motor brake resulting in dynamic braking and regeneration as said final drive will drive said control differential gearbox which will distribute to a drive torque to said alternator.

9. The invention in accordance with claim 7 wherein increased brake pedal displacement results in checking the velocity of said vehicle.

* * * * *